United States Patent [19]

Heimberger

[11] 4,205,027

[45] May 27, 1980

[54] METHOD OF THERMOFIXING CONTINUOUS COUPLING ELEMENTS OF SYNTHETIC-RESIN MONOFILAMENT FOR USE IN SLIDE-FASTENER STRINGERS

[75] Inventor: Helmut Heimberger, Locarno, Switzerland

[73] Assignee: Optilon W. Erich Heilmann GmbH, Cham, Switzerland

[21] Appl. No.: 839,906

[22] Filed: Oct. 6, 1977

[30] Foreign Application Priority Data

Oct. 8, 1976 [DE] Fed. Rep. of Germany ....... 2645454

[51] Int. Cl.$^2$ ............................................... B06B 3/00
[52] U.S. Cl. ...................................... 264/23; 425/814
[58] Field of Search ............... 264/23; 425/174.2, 403, 425/457, 814

[56] References Cited

U.S. PATENT DOCUMENTS

| | | | |
|---|---|---|---|
| 3,069,723 | 12/1962 | Porepp | 264/280 |
| 3,672,008 | 6/1972 | Moertel | 264/23 |
| 3,735,469 | 5/1973 | Moertel | 425/814 |
| 3,770,361 | 11/1973 | Heimberger | 425/814 |
| 4,052,145 | 10/1977 | Stenhall | 425/814 |

*Primary Examiner*—Paul R. Michl
*Attorney, Agent, or Firm*—Karl F. Ross

[57] ABSTRACT

Continuous coupling elements, e.g. coils of synthetic-resin monofilament, preferably in an interconnected state, are heated to a thermofixing temperature and, with the aid of additional ultrasonic energy and pressure, have upper shanks of each coupling member deformed to provide recesses adapted to receive the stitches for attachment of the coupling elements to a support tape.

5 Claims, 4 Drawing Figures

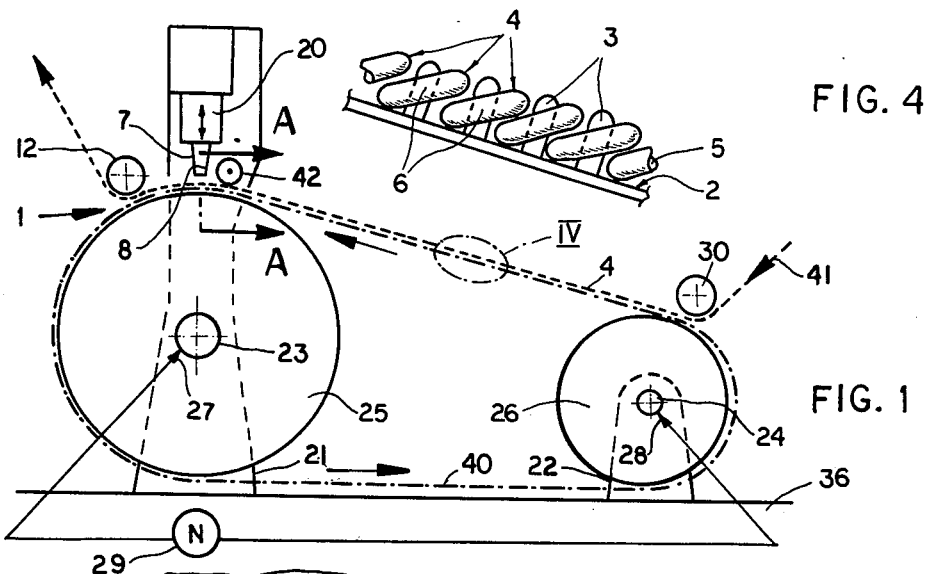
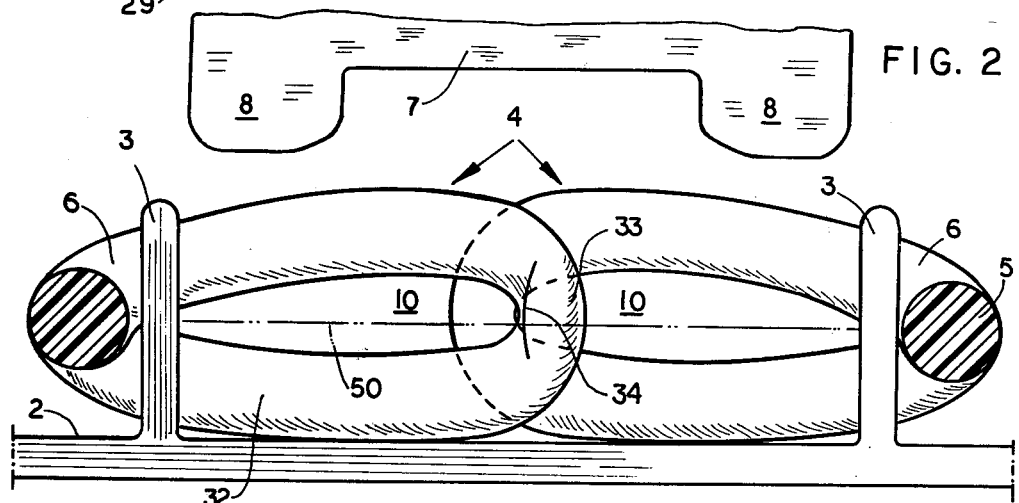
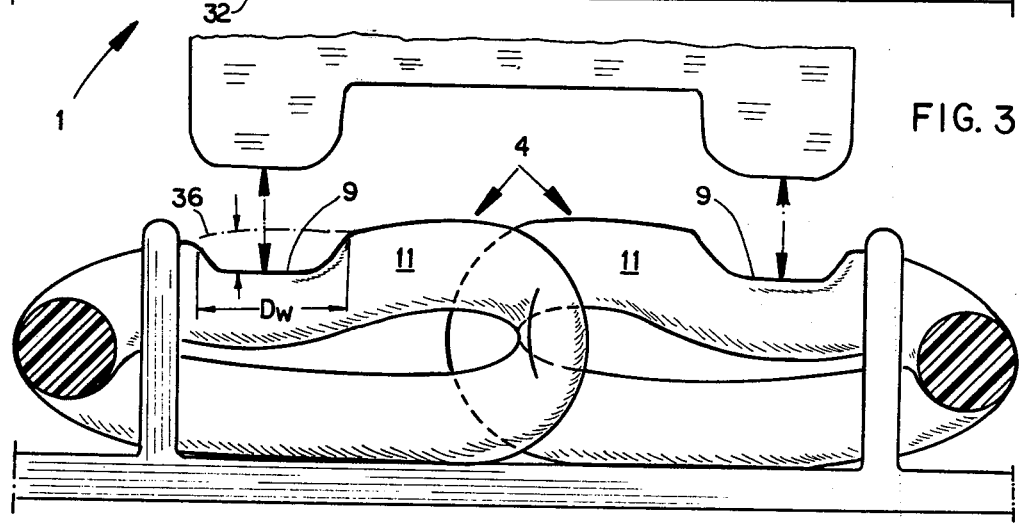

METHOD OF THERMOFIXING CONTINUOUS COUPLING ELEMENTS OF SYNTHETIC-RESIN MONOFILAMENT FOR USE IN SLIDE-FASTENER STRINGERS

FIELD OF THE INVENTION

The present invention relates to a method of thermoforming of continuous coupling elements of synthetic-resin monofilament and, more particularly, to the thermoforming and thermofixing of coupling coils for use in slide-fastener stringers.

BACKGROUND OF THE INVENTION

A slide-fastener stringer using a continuous monofilament coupling element generally comprises a support tape to one edge of which is affixed a continuous coupling element or coil which interdigitates with an opposing coupling element or coil on the edge of another support tape upon movement of a slider along the stringer.

When the coupling element consists of a coil, e.g. of polyester synthetic-resin monofilament, each turn of the coil comprises a coupling member which is formed on one side with a coupling head receivable between the turns or coupling heads of the opposite coupling element.

Each turn may have a lower shank adapted to rest against the tape and an upper shank over which passes the stitching, e.g. double-lock stitch or chain stitching, which secures each coupling element to the support tape. The coupling heads may be deformed transversely to the length of the synthetic-resin monofilament, i.e. parallel to the axis of the coil so that projections of the coupling head reach behind the coupling heads of the opposing coupling element. Such coupling members are thus chained together by being formed on the synthetic-resin monofilament.

Since the coupling elements are formed by coiling a synthetic-resin monofilament, stresses arise during the coiling operation which generally must be relieved by a process which can be termed thermofixation. In this process the monofilament is heated, usually after coiling, to a temperature sufficient to cause internal relaxation and hence retention of the pitch of the coupling element, i.e. the interhead spacing, and relief of the internal stresses formed by the coiling process. This temperature may be as much as or slightly less than the softening point of the synthetic-resin monofilament.

In general, the thermofixation is purely a stress-relieving operation after the synthetic-resin monofilament has been coiled into its final shape, thereby fixing this shape. The thermofixing can be carried out after the monofilament has been coiled and while the turns of the coupling element lie in beds in a forming tool.

The heating can be effected by ultrasonic energy. It has not been possible, with these earlier systems, to provide the turns of the coupling element with thread-receiving recesses in which the threads by which the coupling element is attached to the tape can be positively positioned and retained so that the stitching threads do not project materially beyond the outlines of the coupling element and hence are subject to wear by the slider.

A recess of the type referred to should, therefore, have a depth equal at least to the thickness of the stitching thread.

The recessing of the threads of the retaining seam in the turns of the coupling element has been found to be especially necessary when the slide fastener is used as a shoe closure along the inside of a boot or shoe and hence may be subjected to wear not only by the slider but in actual walking operations.

If one attempts to provide such thread-receiving recesses by embossing or the like, once the coupling element has been fabricated completely, it is found that one obtains not only the recesses but a practically uncontrolled alteration in the shape of the coupling member which results in variation in the depth to which each coupling member engages in the opposing coupling element but also a broadening of the synthetic-resin monofilament in the region of the recesses which alters the pitch (i.e. interhead spacing) and causes problems during the attachment of the coupling element to the tape by sewing.

When, however, attempts are made to avoid these problems by forming the recesses by removal of material, e.g. milling or cutting, the synthetic-resin monofilament is impermissibly weakened.

OBJECT OF THE INVENTION

It is thus the principal object of the present invention to provide an improved method of forming continuous monofilament coupling elements without internal stresses and with stitch-receiving recesses whereby the aforementioned disadvantages are avoided.

SUMMARY OF THE INVENTION

These objects and others which will become apparent hereinafter are attained, in accordance with the present invention, in a method of fabricating coupling elements of the type described in which the coupling elements and the coupling members, heated to thermofixing temperature during the thermofixing or in conjunction therewith, by the use of pressure and additional ultrasonic energy are compressed to reduce the cross section of each coupling member (orthogonal to the plane of the coupling elements) and simultaneously with the aid of this additional ultrasonic energy are formed with stitch-receiving recesses in an upper unsupported shank of the coupling member.

More particularly, the invention provides that the coupling element is entrained by a tool past a forming station so that the individual coupling members lie in respective beds or spaces between teeth of the tool with one shank of each coupling member resting against the tool while another shank is disposed freely above the first shank.

The tool is advantageously heated to the thermofixing temperature, i.e. a temperature in which the internal stresses of the coupling coil are relaxed, and in addition, at the aforementioned station, projections are pressed into the upper shanks while additional ultrasonic energy is applied to carry out the recessing of the upper shanks and the compression of the coupling member simultaneously.

The concept of "additional ultrasonic energy" is intended to mean energy which is generated ultrasonically at the immediate site of the recessing of the upper shank and which is provided in addition to the energy required for thermofixing.

The invention utilizes my surprising discovery that, when the performed coupling members have been heated to the thermofixing temperature or at least are at the thermofixing temperature and are yet retained in the spaces between teeth of the forming tool, i.e. a forming wheel or forming conveyor band, stitch-receiving recesses can be pressed into the upper shanks without detrimental broadening thereof or variation in the pitch (interhead spacing) of the coupling element.

Preferably, the coupling element is heated by conduction with, for example, ohmically resistively generated heat from the heated tool. This heating must suffice to bring the coupling element to the thermofixing temperature.

Another preferred feature of the invention, two coupling members in a coupled state, i.e. with their heads mutually interdigitated, are simultaneously heated to the thermofixing temperature and provided with the stitch-receiving recesses.

BRIEF DESCRIPTION OF THE DRAWING

The above and other objects, features and advantages of the present invention will become more readily apparent from the following description, reference being made to the accompanying drawing in which:

FIG. 1 is a diagrammatic side-elevational view of an apparatus for carrying out the process according to the invention;

FIG. 2 is a sectional view taken along the line A—A of FIG. 1 but drawn to an enlarged scale and showing the device before the recessing of the upper shanks of the coupling members;

FIG. 3 is a view similar to FIG. 2 but showing the device after the recessing of the upper shanks of the coupling members; and FIG. 4 is a detail view drawn to an enlarged scale of the region IV of FIG. 1.

SPECIFIC DESCRIPTION

The apparatus shown in FIG. 1, by way of example, uses a forming conveyor band 40 as part of the tool for recessing the coupling elements 41 which in an interdigitated state, are laid into forming beds of the belt or band 40.

The band 40 has an upper surface 2 from which pins 3 project upwardly to define the respective beds, the coupling elements being laid into these beds so that the bights interconnecting the individual coupling members 4 extend around the respective pins 3 which are thus disposed outwardly from the heads 33 which have lateral projections 34 reaching behind the projections of the opposite coupling element.

The apparatus comprises a base 36 from which supports 21 and 22 extend upwardly, the support 21 carrying a shaft 23 upon which is mounted a wheel 25 about which the band 40 passes. Disposed along a radius of the wheel 25, is a vertically displaceable piston 20 which carries an ultrasonic tool 7, i.e. a sonotrode, (see U.S. Pat. Nos. 3,333,323; 3,302,277; 3,330,026 and 3,378,429), formed at its bottom end with a pair of projections 8 adapted to produce recesses 9 in the upper shanks 11 of each of the coupling members.

The wheel 25 acts as an anvil against which the tool 7,8 presses the coupling members 4 and which supports the belt 40 and hence the surface 2. The tool 7, 8 is vertically reciprocatable by the pneumatic cylinder 20 which is mounted on the post 21.

A further roller 42 retains the coupling elements in their respective beds just ahead of the tool 7, 8.

The support 22 carries a metallic wheel 26 which rotates on a shaft 24, the shafts 23 and 24 being engaged by brushes 27 connected to an ohmic heating source 29 so that an electric current passes through the metallic band 40 and resistively heats the latter to the thermofixing temperature. Thus the ultrasonic energy supplied by the tool 7, 8 is in addition to that which is necessary to bring the coupling elements to the thermofixing temperature.

As can be seen from FIGS. 2 and 3, each coupling member 4 has, in addition to the head 33 and the lateral projections 34, a lower shank 32 which rests against the surface 2 and an upper shank 11 which freely overlies the lower shank 32.

The recesses 9 which are simultaneously formed in two adjacent coupling members of the opposite coupling elements, can have a depth D below the outline 36 of the upper shank which is at least equal to the thickness of the stitching used to connect the coupling element to a support tape and a width W which is at least equal to the width of the stitching overlying the shanks. When couble-lock stitching or chain stitching is used, two threads usually overlie each shank and hence W should be at least equal to 2D.

The apparatus of FIG. 1 can be used without the band 40 if the wheel 25 is ohmically heated and provided directly with the surface 2 and the projections 3.

The projections 3 form teeth on the upper surface of the tool 2 which have a height approximately equal to the height of each coupling member as measured transversely to the coupling element plane which has been represented at 50 in FIG. 2. The coupling elements have their bights or connecting portions 6 extending externally around the teeth or pins 3.

In the region of the tool 7, 8, the coupling elements previously heated to the thermofixing temperature are subjected to pressure and the additional ultrasonic energy and are compressed. As a result the coupling members 4 are reduced in cross section as a comparison of FIGS. 2 and 3 will demonstrate. Consequently, the free-eye space 10 in the interior of each coupling member 4 is reduced.

Simultaneously, with the aid of the ultrasonic energy, thread-receiving recesses 9 are formed in the upper shank 11 of each coupling member as can be seen from FIG. 3. Should the recessing of the upper shank produce a ridge or burr, the latter is smoothed out by the roller 12 which is disposed downstream of the forming sonotrode 8. The smoothing roller 12 can be heated or unheated.

I claim:
1. A process for the thermal treatment of continuous coupling elements of synthetic-resin monofilament for use in a slide-fastener stringer, comprising the steps of:
   introducing a succession of turns of synthetic-resin monofilament forming respective coupling members in the spaces between teeth of a support with a lower shank of each coupling member bearing against said support and an upper shank of each coupling member being disposed freely above said support;
   heating said coupling members on said support to a thermofixing temperature; and
   pressing the upper shank only of each member while applying ultrasonic energy thereto to depress each upper shank toward the respective lower shank and to simultaneously form a thread-receiving recess in the upper shank over only a limited portion of the length thereof while the upper shank is held at said temperature.

2. The process defined in claim 1 wherein said coupling members are heated to said temperature by conduction from a heated support.

3. The process defined in claim 2, further comprising the step of ohmically heating said support.

4. The process defined in claim 1 wherein a pair of interdigitated coupling members are disposed in said support and are simultaneously deformed to provide such recesses therein.

5. The process defined in claim 1 wherein said recesses are formed with a width which is at least equal to twice the depth of the recess.

* * * * *